United States Patent
Gauvin

(10) Patent No.: US 8,347,381 B1
(45) Date of Patent: Jan. 1, 2013

(54) DETECTING MALICIOUS SOCIAL NETWORKING PROFILES

(75) Inventor: William Gauvin, Leominster, MA (US)

(73) Assignee: Symantec Corporation, Mountain View, CA (US)

( * ) Notice: Subject to any disclaimer, the term of this patent is extended or adjusted under 35 U.S.C. 154(b) by 594 days.

(21) Appl. No.: 12/414,005

(22) Filed: Mar. 30, 2009

(51) Int. Cl.
   *G06F 7/04* (2006.01)
(52) U.S. Cl. .............. 726/22; 726/23; 726/24; 726/25
(58) Field of Classification Search ............ 726/22, 726/25, 23–24, 26
   See application file for complete search history.

(56) References Cited

U.S. PATENT DOCUMENTS

2008/0313648 A1* 12/2008 Wang et al. .......... 719/315
2010/0138925 A1* 6/2010 Barai et al. .......... 726/25

OTHER PUBLICATIONS

Lin, Y-R. et al., "Splog Detection Using Content, Time and Link Structures," ICME 2007, IEEE, pp. 2030-2033.
Lin, Y-R. et al., "The Splog Detection Task and a Solution Based on Temporal and Link Properties," TREC blog Track, 2006, http://trec.nist.gov/pubs/trec15/papers/nec.blog.final.pdf, pp. 1-14.

* cited by examiner

*Primary Examiner* — Samson Lemma
(74) *Attorney, Agent, or Firm* — Fenwick & West LLP

(57) ABSTRACT

Access of a social networking profile on a social networking website is detected. Characteristics of the social networking profile are analyzed to determine whether the social networking profile is malicious. Responsive to determining that the social networking profile is malicious, the social networking profile is reported as being malicious.

17 Claims, 5 Drawing Sheets

DETECTING MALICIOUS SOCIAL NETWORKING PROFILES

BACKGROUND OF THE INVENTION

1. Field of the Invention

This invention pertains in general to security management for social networking websites, and more specifically to detecting malicious social networking profiles.

2. Description of the Related Art

Social networking services have opened up many new avenues to building social networks by allowing users to share information online and connect with a wide range of different users. Social networking services, such as FACEBOOK®, MYSPACE®, and LINKEDIN®, maintain profiles created by users of the service. A user's profile allows other users to learn about the user and communicate with the user. A user's profile includes, for example, information about the user, pictures posted by the user, a listing of the user's friends, and comments posted by users. The amount and types of information that can be shared in these social networking environments is vast.

Malicious entities have taken advantage of the resources of social networking services and have created malicious profiles. A malicious profile is created by a malicious entity with the purpose of deceiving users that access the profile. A malicious profile looks like a normal profile (e.g., a user profile), but in reality it is an image of a normal profile and the image is a hyperlink.

When a user accesses the malicious profile and clicks anywhere on the image, the hyperlink causes the user to be directed to the malicious entity's website or another website that is on a different domain than that of the social networking service's website. The website may contain content that the user is not interested in and/or content the user is not suppose to be looking at (e.g., pornographic content). The website may also try to obtain personal information from the user, such as social security number and credit card numbers. Accordingly, there is a need in the art for ways to detect malicious profiles.

BRIEF SUMMARY OF THE INVENTION

The above and other needs are met by a computer-implemented method, a computer program product, and a computer system for detecting a malicious social networking profile. Embodiment of the computer-implemented method comprise detecting access of a social networking profile on a social networking website. Characteristics of the social networking profile are analyzed to determine whether the social networking profile is malicious. Responsive to a determination that the social networking profile is malicious, the social networking profile is reported as being malicious.

Embodiments of the computer program product have a computer-readable storage medium having computer-executable code. The computer-executable code comprises a monitoring module configured to detect access of a social networking profile on a social networking website. The computer-executable code further comprises a validation module configured to analyze characteristics of the social networking profile to determine whether the social networking profile is malicious. The computer-executable code further comprises a reporting module configured to report the social networking profile as being malicious, responsive to a determination that the social networking profile is malicious.

Embodiments of the computer system comprise a computer processor and a computer-readable storage medium storing computer program modules configured to execute on the computer processor. The computer program modules comprise a monitoring module configured to detect access of a social networking profile on a social networking website. The computer program modules further comprises a validation module configured to analyze characteristics of the social networking profile to determine whether the social networking profile is malicious. The computer program modules further comprises a reporting module configured to report the social networking profile as being malicious, responsive to a determination that the social networking profile is malicious.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
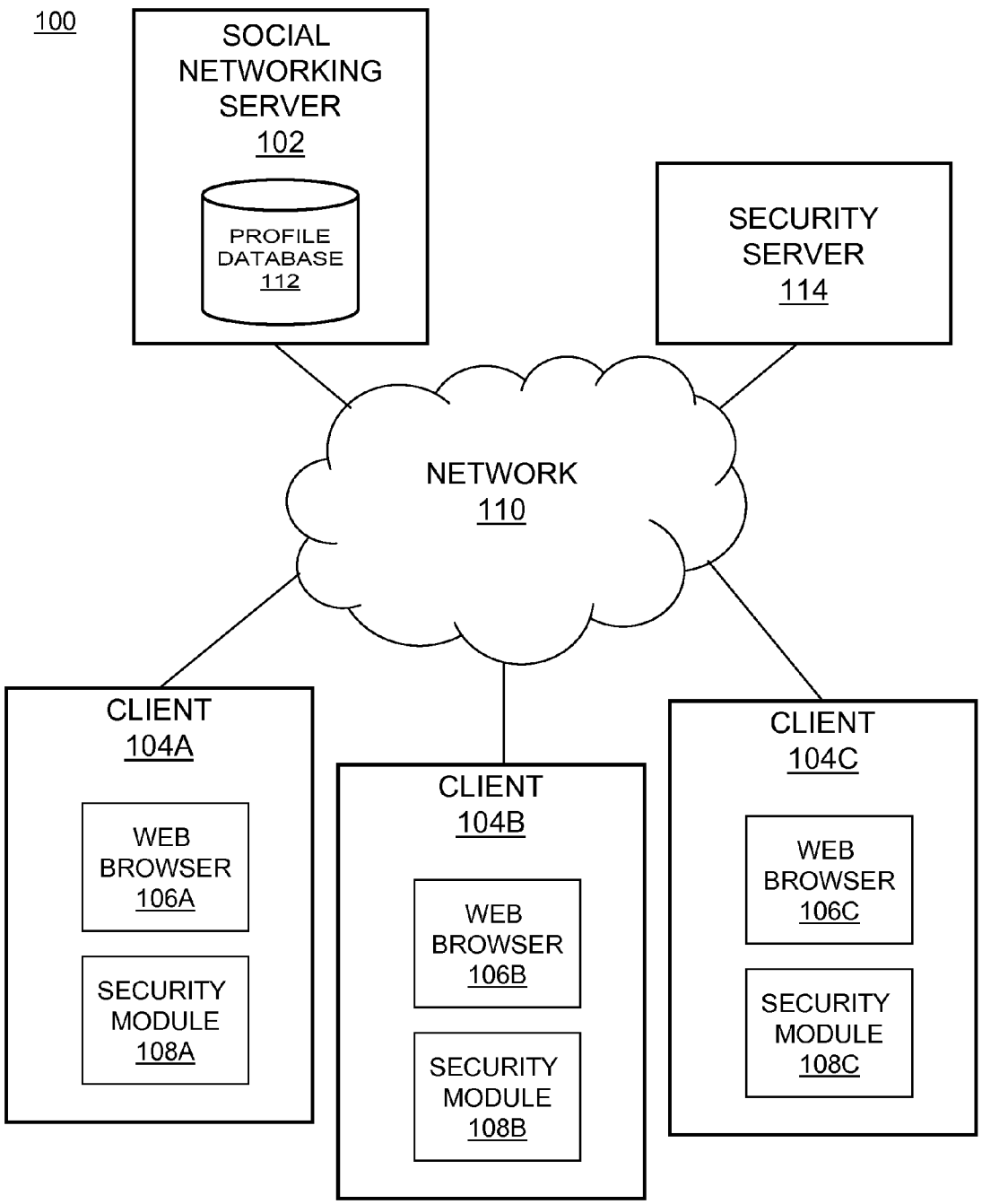
FIG. 1 is a high-level block diagram illustrating a computing environment according to one embodiment.

FIG. 1 is a high-level block diagram illustrating a computing environment 100 according to an embodiment. FIG. 1 illustrates a social networking server 102, three clients 104, and a security server 114 connected by a network 110. Only three clients 104 are shown in FIG. 1 in order to simplify and clarify the description. Embodiments of the computing environment 100 can have thousands or millions of clients 104 connected to the network 104.

FIG. 1 uses like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral (e.g. "104" in the text refers to reference numerals "104A," "104B," and/or "104C" in the figures).

In one embodiment, the social networking server 102 is located at a website provided by a social networking service (e.g., FACEBOOK®, MYSPACE®, LINKEDIN®, etc.), although the server 102 can also be provided by another entity. The social networking server 102 includes a profile database 112 that stores legitimate profiles created by users/ members of the social networking service. A legitimate profile may be for a specific user or group of the social networking service.

Additionally, the profile database 112 includes malicious profiles created by malicious entities. The difference between legitimate profiles and malicious profiles is that malicious profiles are created with the malicious intent of deceiving users, whereas legitimate profiles are created with the intent of sharing information with users. In one embodiment, a malicious profile is a profile that deceives users into believing it is a legitimate profile and directs users that access the profile to a malicious website.

In one embodiment, the user is directed to the malicious website automatically upon accessing the malicious profile. In another embodiment, the user is directed to the malicious website after the user clicks anywhere on the malicious profile. In one embodiment, a malicious profile is an image (e.g. JPEG) of a legitimate profile. The image is a hyperlink that when clicked on by the user, results in the malicious website being presented to the user.

The social networking server 102 allows clients 104 to access profiles (i.e., legitimate and malicious profiles) stored in the profile database 112. Upon receiving a request from a client 104 to access a specific profile, the social networking server 102 identifies the profile in the profiles database 112, and transmits the profile to the client 104 via the network 110 for presentation at the client 104. In one embodiment, the social networking server 102 requires that a user at a client 104 sign into the social networking service prior to allowing the client 104 to access profiles.

The clients 104 are computers or other electronic devices used by one or more users that can interact with the social networking server 102, the security server 114 and other clients 104. The clients 104, for example, can be personal computers. In other embodiments, a client 104 is a network-capable device other than a computer, such as a personal digital assistant (PDA), a mobile telephone, a pager, a television "set-top box," etc. The client 104 preferably execute an operating system (e.g., LINUX®, one of the versions of MICROSOFT WINDOWS®, and PALM OS®), which controls the operation of the client 104, and execute one or more application programs.

Each client 104 executes a web browser 106 (e.g., MICROSOFT INTERNET EXPLORER® and MOZZILA FIREFOX®) and a security module 108. In one embodiment, the security module 108 is integrated into the web browser 106, such as a plug-in or browser helper object. In another embodiment, the security module 108 is separate from the web browser 106. The web browser 106 allows users of the client 104 to browse and search for information available at the websites of the servers coupled to the network 110. Specifically, the web browser 106 allows users of the client 104 to access profiles stored at the social networking server 102. Additionally, users of the client 104 can use the browser 106 to perform activities and make requests for or otherwise acquire information from the social networking server 102, the security server 114, and other clients 104. For example, a user can communicate with the social networking server 102 through the web browser 106 for creating a new profile, editing an existing profile, posting text and photos on a profile, providing and sharing information, contacting other users, etc.

The security module 108 detects when the client 104 accesses a malicious profile stored at the social networking server 102. To detect a malicious profile, the security module 108 monitors the communications between the client 104 and the social networking server 102. If the client 104 requests to access a profile stored at the social networking server 102, the security module 108 analyzes the requested profile to determine whether profile is a malicious profile. In one embodiment, the profile is analyzed prior to the profile being presented at the client 104. In another embodiment, the profile is analyzed in parallel to the profile being presented at the client 104.

The security module 108 analyzes the profile and determines whether it conforms to a legitimate fingerprint. The legitimate fingerprint describes characteristics of legitimate profiles (legitimate characteristics). A legitimate characteristic is information or data typically found in legitimate profiles, such as a profile having a friends list. The security module 108 determines whether the profile conforms to the legitimate fingerprint based on whether the profile includes the legitimate characteristics described by the fingerprint. If the profile does not conform to the legitimate fingerprint, the security module 108 identifies the profile as being suspicious and performs further analysis of the profile to determine if it is malicious.

The security module 108 determines whether the suspicious profile conforms to a malicious fingerprint in order to determine whether the profile is malicious. The malicious fingerprint describes characteristics of malicious profiles (malicious characteristics). A malicious characteristic is information or data normally found in malicious profiles, such as the display of the friends list being disabled. The security module 108 determines whether the profile conforms to the malicious fingerprint, based on whether the profile includes the malicious characteristics of the malicious profile. If the profile conforms to the malicious fingerprint, the security module 108 identifies the profile as being a malicious profile and reports that the profile is malicious. Reporting the malicious profile can include the security module 108 notifying the user of the client 104 that the profile being accessed is malicious.

"Characteristic" as used herein refers to any type of information or data that may be found in a profile. Characteristics for example may include: mark-up language tags (e.g., HTML tags), attributes of interpreted languages (e.g., Java Script/.NET), uniform resource locators (URLs), strings of text and/or numbers, words, keys, commands, features, images, and files.

The security server 114 periodically provides the clients 104 with fingerprints for analyzing profiles. Legitimate fingerprints provided to the clients 104 by the security server 114 describe characteristics that have been identified by administrators of the server as typically being included in legitimate profiles. Malicious fingerprints provided to the clients 104 by the security server 114 describe characteristics that have been identified by administrators of the server as typically being included in malicious profiles. In one embodiment, the security server 114 is provided by the SYMANTEC CORPORATION®, although the server can also be provided by another entity.

The network 110 enables communications among the entities connected to it. In one embodiment, the network 110 is the Internet and uses standard communications technologies and/or protocols. Thus, the network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
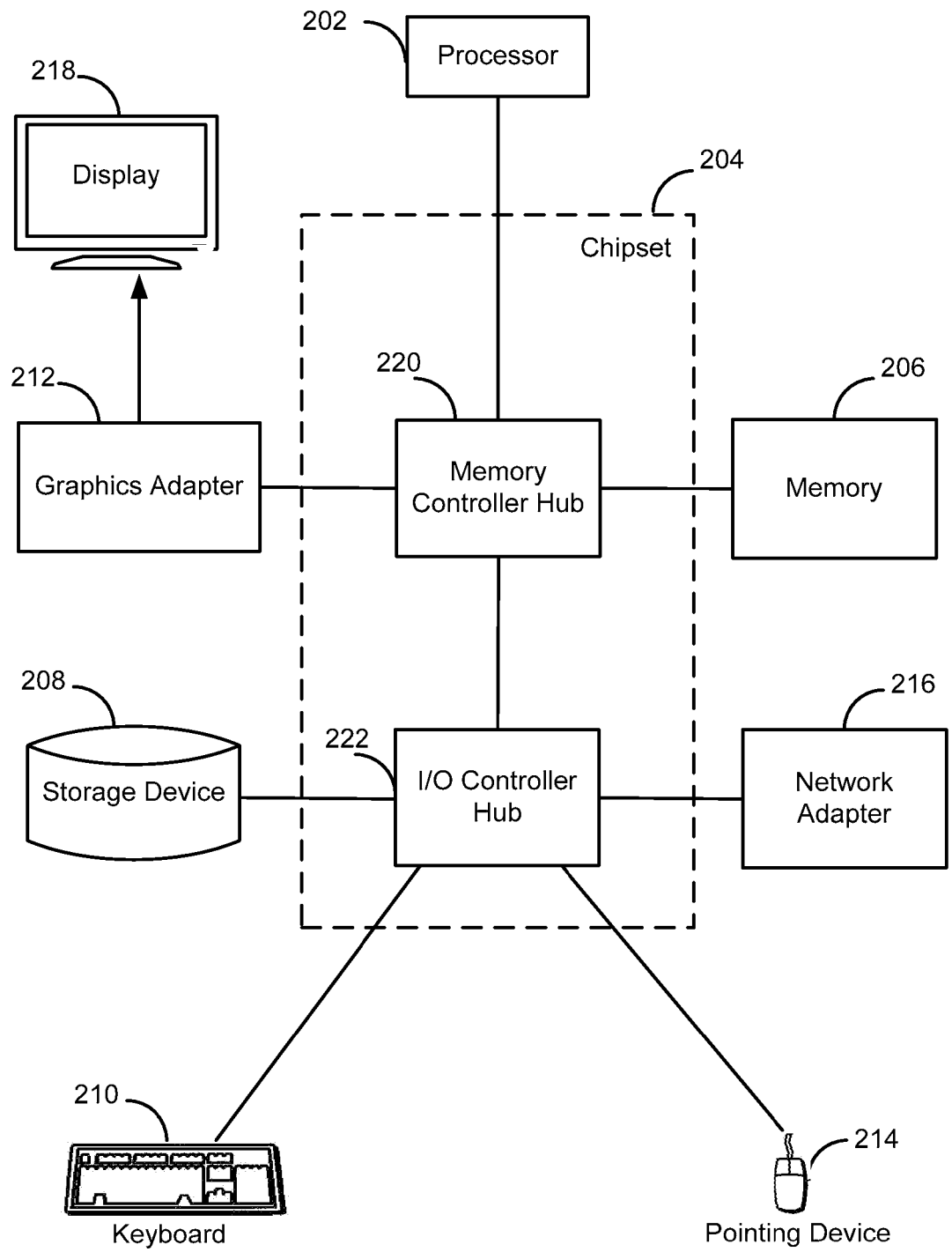
FIG. 2 is a high-level block diagram illustrating an example of a computer for use as the social networking server, a client, and/or the security server.

FIG. 2 is a high-level block diagram illustrating an example of a computer 200 for use as the social networking server 102, a client 104, and/or the security server 114. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 110. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 104 that is a mobile telephone typically has limited processing power, a small display 218, and might lack a pointing device 214. The social networking server 102, in contrast, may comprise multiple blade servers working together to provide the functionality described herein.

Figure 3:
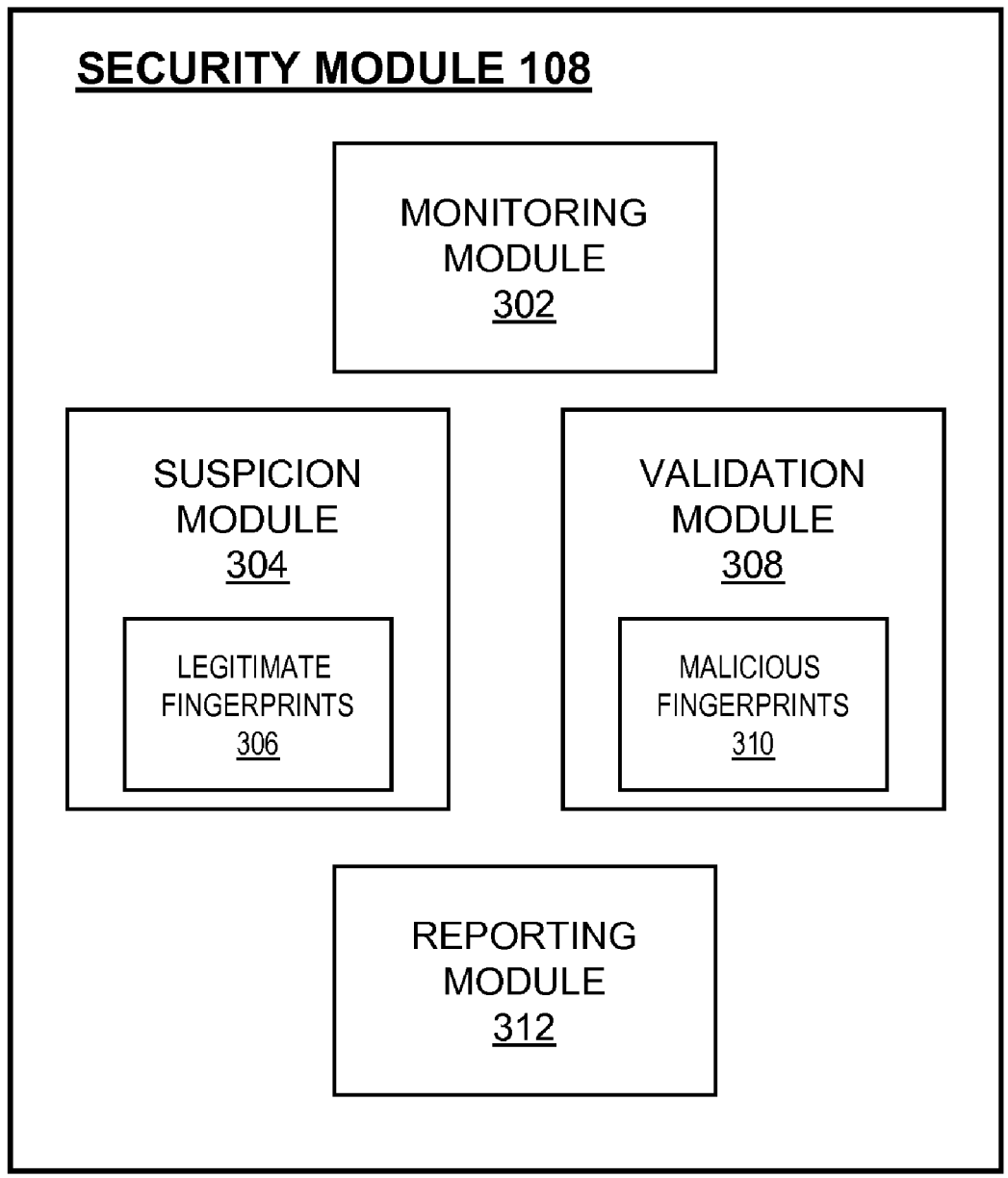
FIG. 3 is a high-level block diagram illustrating a detailed view of the security module of a client according to one embodiment.

FIG. 3 is a high-level block diagram illustrating a detailed view of the security module 108 of a client 104 according to one embodiment. As shown in FIG. 3, the security module 108 includes a monitoring module 302, a suspicion module 304, a validation module 308, and a reporting module 312. Those of skill in the art will recognize that other embodiments of the security module 108 can have different and/or other modules than the ones described here, and that the functionalities can be distributed among the modules in a different manner.

The monitoring module 302 monitors communications between the client 104 and the social networking server 102. Specifically, the monitoring module 108 monitors for any requests by the client 104 to access a profile stored at the social networking server 102. If the monitoring module 302 detects a request to access a profile, the monitoring module 302 flags the profile when it is received at the client 104. The monitoring module 302 flags the profile so that it can be analyzed and a determination can be made as to whether the profile is malicious.

In one embodiment, the monitoring module 302 does not allow the profile to be presented at the client 104 until a determination is made as to whether the profile is malicious. In one embodiment, the profile is presented at the client, but the monitoring module 302 does not allow the profile to direct the client 104 to a website on a different domain than that of the social networking server's website. In one embodiment, the profile is presented at the client 104 and the monitoring module 302 does not allow the profile to direct the client 104 to any webpage, even if it is on the same domain as the social networking server's website. In another embodiment, the profile is presented at the client 104 and the monitoring module 302 does not initially block any of the functionality of the profile.

The suspicion module 304 analyzes a profile flagged by the monitoring module 302 to determine whether it conforms to a legitimate fingerprint. The suspicion module 304 includes legitimate fingerprints 306. Each legitimate fingerprint describes characteristics that are typically found in legitimate profiles. Examples of the types of characteristics that are normally found in legitimate profiles include: general information about the entity associated with the profile (e.g., membership duration), activity of the entity (e.g., last time entity logged in), state of the entity (e.g., current mood), attributes of the entity (e.g., religion, relationship status, education, occupation), presence of a friends list, presence of a comments list, presence of a wall, specific format of the profile, tags required by social networking service in the profile, and fields required by social networking service (e.g., profile including an image).

The legitimate fingerprints 306 included in the suspicion module are received from the security server 114. Periodically, the legitimate fingerprints 306 are updated when the security server 114 transmits to the client 104 new legitimate fingerprints for analyzing profiles. If the suspicion module 304 receives instructions that a legitimate fingerprint is no longer valid for analyzing profiles, the suspicion module 304 removes the legitimate fingerprint from the collection of legitimate fingerprints 306.

In one embodiment, each legitimate fingerprint is used by the suspicion module 304 to analyze a different type of profile and each legitimate fingerprint describes a different set of legitimate characteristics. For example, a legitimate fingerprint for analyzing MYSPACE® profiles describes characteristics found in MYSPACE® profiles. As another example, a legitimate fingerprint for analyzing group profiles describes characteristics found in group profiles. In one embodiment, multiple legitimate fingerprints are used by the suspicion module 304 to analyze a profile.

When the monitoring module 302 flags a profile, the suspicion module 304 selects at least one legitimate fingerprint that corresponds to the profile for analyzing the profile (e.g., select a fingerprint describing characteristics of a group profile to analyze a group profile). The suspicion module 304 analyzes the profile and determines whether the profile conforms to the selected legitimate fingerprint. The suspicion module 304 determines whether the profile conforms to the legitimate fingerprint based on whether the profile includes the legitimate characteristics specified by the legitimate fingerprint. In one embodiment, the suspicion module 304 analyzes the profile for the legitimate characteristics using mark-up language scraping techniques and/or pattern matching techniques.

In one embodiment, if the profile does not include at least a specified number of legitimate characteristics specified by the legitimate fingerprint, the suspicion module 304 determines that the profile does not conform to the legitimate fingerprint. For example, assume the specified number is five. If the profile does not include five or more of the legitimate characteristics specified in the legitimate fingerprint, the suspicion module 304 determines that the profile does not conform to the legitimate fingerprint. In one embodiment, the number is specified by an administrator of the security server 114 and contained within the legitimate fingerprint.

In another embodiment, the suspicion module 304 calculates a suspiciousness score to determine whether the profile conforms to the legitimate fingerprint. Each legitimate characteristic contributes a different amount of points to the suspiciousness score based on whether the characteristic is included in the profile. The suspicion module 304 calculates the suspiciousness score by adding the points contributed by each legitimate characteristic.

For example, assume that the legitimate fingerprint specifies, characteristic A and characteristic B. Additionally, assume that if the profile includes characteristic A, 0 points are contributed to the suspiciousness score and if the profile does not include characteristic A, 10 points are contributed to the score for characteristic A. Also, assume that if the profile includes characteristic B, 0 points are contributed to the score and if the profile does not include characteristic B, 5 points are contributed to the score for characteristic B. If the profile includes characteristic A, but does not include characteristic B, the suspiciousness score calculated by the suspicion module 304 is 5.

The suspicion module 304 determines whether profile conforms to the legitimate fingerprint based on the calculated suspiciousness score. In one embodiment, if the suspiciousness score is below a threshold, the suspicion module 304 determines that the profile conforms to the legitimate fingerprint. In another embodiment, if the suspiciousness score is above a threshold, the suspicion module 304 determines that the profile conforms to the legitimate fingerprint. Using the suspiciousness score is beneficial in that each characteristic can have a different weight in determining whether a profile conforms to the legitimate fingerprint.

If the profile does not conform to the legitimate fingerprint, the suspicion module 304 identifies the profile as being suspicious, which means further analysis of the profile is used to determine whether the profile is malicious. On the other hand, if the profile conforms to the legitimate fingerprint, the suspicion module 304 identifies the profile as being a legitimate profile.

The validation module 308 determines whether a profile identified as being suspicious by the suspicion module 304 is a malicious profile. The validation module 308 includes malicious fingerprints 310. Each malicious fingerprint describes characteristics that are normally found in malicious profiles. A first type of malicious characteristic that may be specified in one or more of the malicious fingerprints 310 is a profile having an obfuscated action. Some malicious entities obfuscate the mark up language of a malicious profile to conceal the malicious intent of the profile. For example, a malicious profile may include an HTML tag with a hyperlink to a website and the obfuscated action contained in the tag is a random number of spaces being included between the different characters of the URL (e.g., "http://www.sexyonlineworld.com").

A second type of malicious characteristic that may be specified in one or more of the malicious fingerprints 310 is a profile having a specific command normally found in malicious profiles, such as a profile having an HTML tag of "form name=." A third type of malicious characteristic that may be specified in one or more of the malicious fingerprints 310 is a profile having a specific key typically found in malicious profiles. A key is a control string, such as "UserFriends1_NoFriendspanel."

A fourth type of malicious characteristic that may be included in one or more of the malicious fingerprints 310 is disabling the display of a feature typically included in legitimate profiles. Examples of features that may be disabled by malicious entities in a malicious profile include a friend space, comments, latest blog entries, navigation bar, profile information, contact table, user profile details, and extended network. Malicious entities disable the display of such features so that all that is displayed on a malicious profile is an image of a legitimate profile. It should be understood that the malicious characteristics described above are only examples of types of malicious characteristics and that a malicious profile may specify any characteristic that is normally found in malicious profiles.

The malicious fingerprints 310 included in the validation module 308 are received from the security server 114. Periodically, the malicious fingerprints 310 are updated when the security server 114 transmits to the client 104 new malicious fingerprints for analyzing profiles. If the validation module 308 receives instructions that a malicious fingerprint is no longer valid for analyzing profiles, the validation module 308 removes the malicious fingerprint from the collection of malicious fingerprints 310.

In one embodiment, each malicious fingerprint is used by the validation module 310 to analyze a different type of profile and each malicious fingerprint describes a different set of malicious characteristics. In one embodiment, the validation module 308 uses multiple malicious fingerprints to analyze a profile.

When the suspicion module 304 identifies a profile as being suspicious, the validation module 308 selects at least one of the malicious fingerprints 310 that corresponds to the profile for analyzing the profile. The validation module 308 analyzes the profile and determines whether the profile conforms to the selected malicious fingerprint. The validation module 304 determines whether the profile conforms to the malicious fingerprint by determining whether the profile includes the malicious characteristics specified by the malicious fingerprint. In one embodiment, the validation module 310 analyzes the profile for malicious characteristics using mark-up language scraping techniques and/or pattern matching techniques.

In one embodiment, if the profile includes at least a specified number of malicious characteristics specified in the malicious fingerprint, the validation module 308 determines that the profile conforms to the malicious fingerprint. For example, assume the specified number is two, if the profile includes two or more of the malicious characteristics specified in the malicious fingerprint, the validation module 308 determines that the profile conforms to the malicious fingerprint. In one embodiment, the number is specified by an administrator of the security server 114 and is contained within the malicious fingerprint.

In another embodiment, the validation module 308 calculates a validation score for determining whether the profile conforms to the malicious fingerprint. Each malicious characteristic of the fingerprint contributes a different number of points to the suspiciousness score based on whether the characteristic is included in the profile. The validation module 308 calculates the validation score by adding the points contributed by each malicious characteristic.

Based on the calculated validation score, the validation module 308 determines whether the profile conforms to the malicious fingerprint. In one embodiment, if the validation score is below a threshold, the validation module 308 determines that the profile conforms to the malicious fingerprint. If the validation score is above the threshold, the validation module 308 determines that the profile does not conform to the malicious fingerprint.

If the validation module 308 determines that the profile conforms to the malicious fingerprint, the validation module 308 identifies the profile as being a malicious profile. However, if the profile does not conform to the malicious fingerprint, the validation module 308 identifies the profile as being a legitimate profile.

The reporting module 312 reports whether a profile is malicious based on the determinations reached by the other modules. The reporting can take different forms depending upon the embodiment. In one embodiment, the reporting module 312 reports the status of a profile (e.g., legitimate, suspicious, or malicious) to the user via a visual or audio signal. For example, the reporting module 312 can display an icon in association with the browser 106 that indicates the status of the profile. Similarly, the reporting module 312 can present a dialog box or other message to the user indicating the status of the profile. The reporting module 312 can also report the status of the profile to the security server 114 and/or social networking server 102.

Further, the reporting module 312 can apply a security policy to the profile based on the profile's status. For example, the reporting module 312 can prevent the browser 106 from accessing a domain other than the domain of the social networking server 102 in response to a determination that the profile is malicious. As another example, in response to a determination that the profile is malicious, the reporting module 312 can prevent the browser 106 from accessing any domain, including the domain of the social network server 102. The reason for not allowing the browser 106 to access the domain of the social network server 102 is because the social network server 102 may be compromised and may redirect the browser 106 to another domain.

The actions performed by the reporting module 312 can be configured by the user of the client 104. The user can establish the configuration in advance (e.g., by configuring settings of the security module 108), or by specifying actions to perform at the time a malicious profile is detected. For example, the user can configure the reporting module 312 to present the profile regardless of whether it is malicious. Similarly, the user can configure the reporting module 312 to direct the browser 106 to another webpage (e.g., last webpage visited, last profile visited, homepage of social networking service) responsive to detection of a malicious profile. In one embodiment, if the suspicion module 304 and/or the validation module 308 identifies a profile as being legitimate, the reporting module 312 will allow the profile to be presented to the user without any restrictions.

Figure 4A:
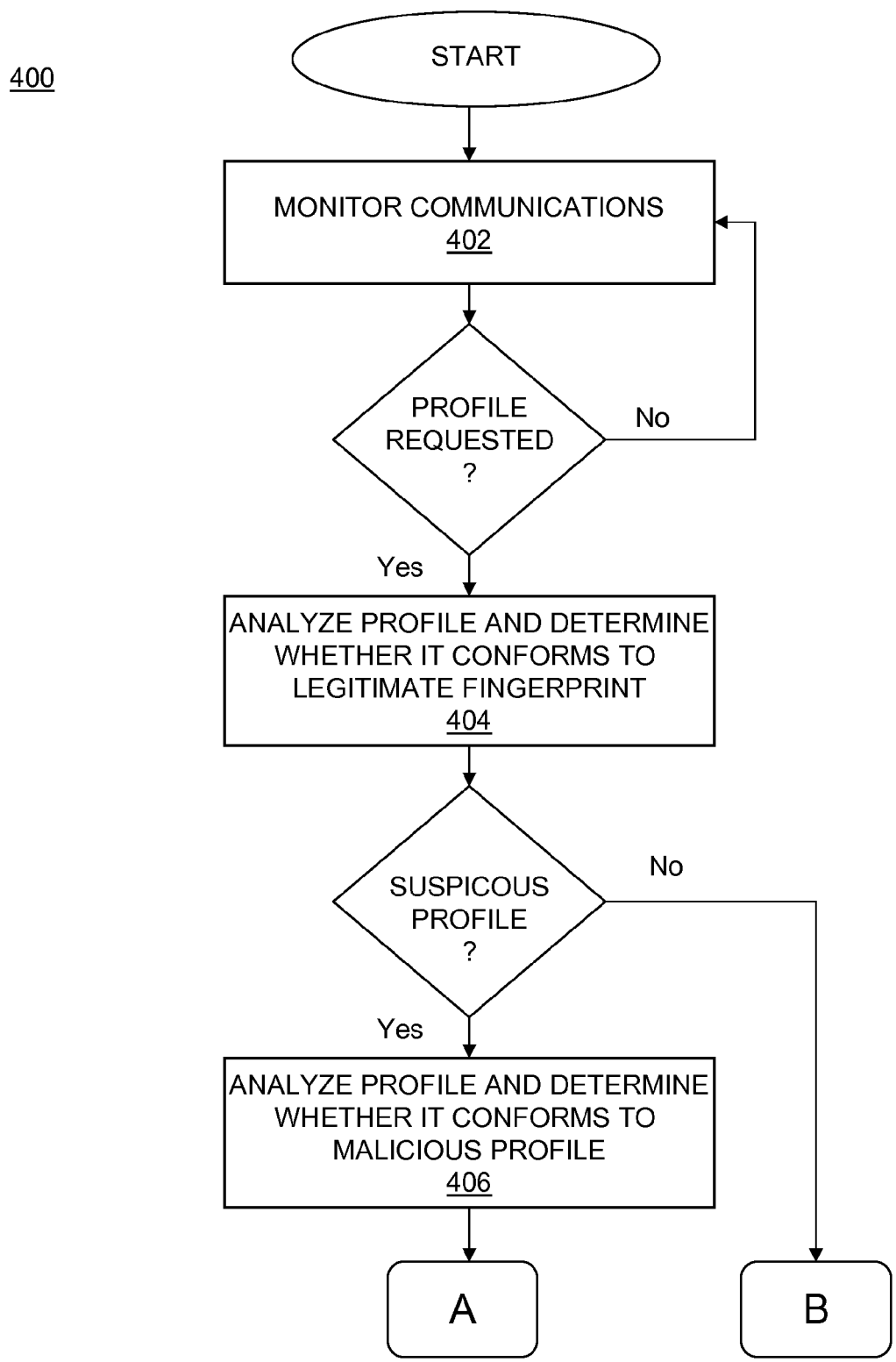
FIGS. 4A and 4B is a flowchart illustrating the steps performed by the security module in detecting a malicious profile according to one embodiment.
Figure 4B:
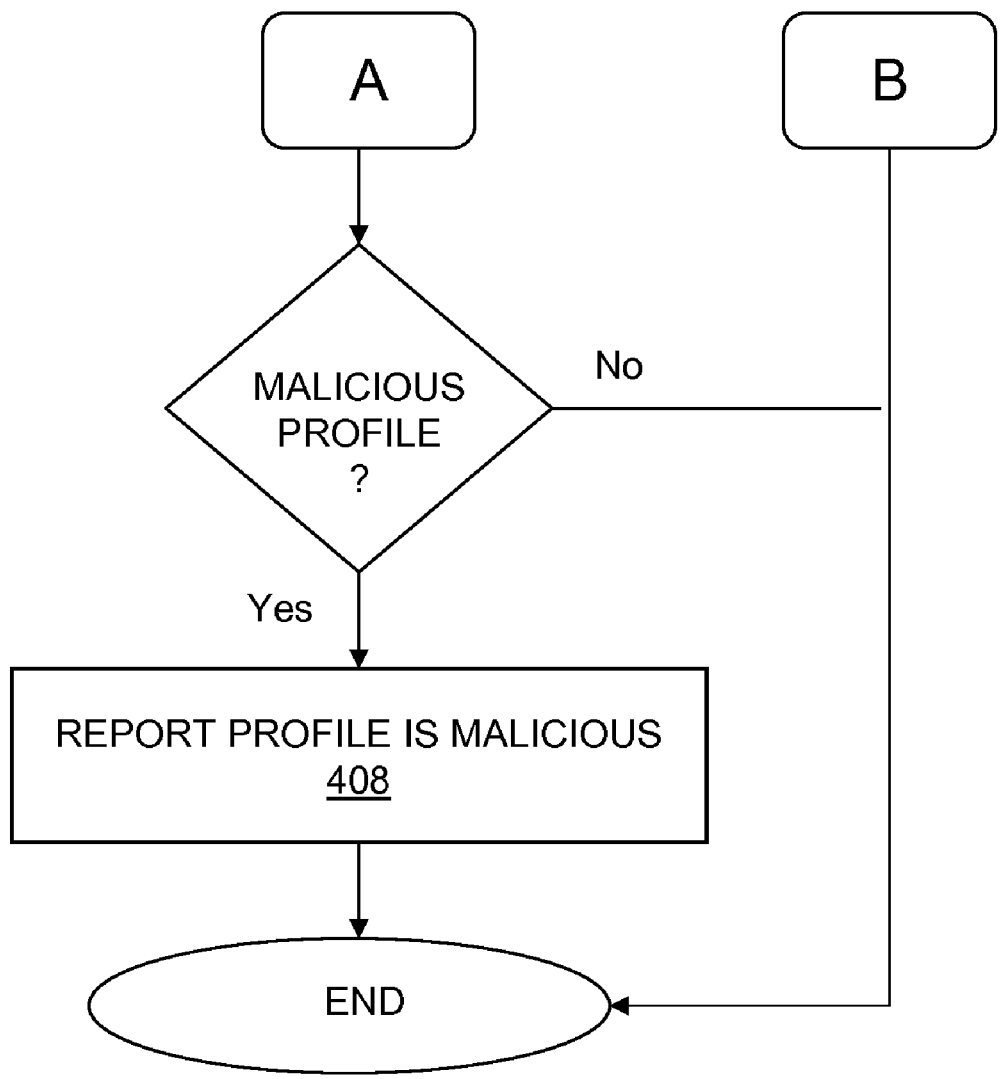

FIGS. 4A and 4B is a flowchart 400 illustrating the steps performed by the security module 108 in detecting a malicious profile according to one embodiment. Other embodiments perform the illustrated steps in different orders, and/or perform different or additional steps. Additionally, in other embodiments, some or all of the steps may be performed by different modules.

The security module 108 monitors 402 the communications between the client 102 and the social networking server 102. If the client 102 requests access to a profile, the security module 108 analyzes 404 the profile when it is received from social networking server 102. The security module 108 analyzes the profile to determine whether it conforms to a legitimate fingerprint. The legitimate fingerprint describes characteristics of legitimate profiles. The security module 108 determines whether the profile conforms to the legitimate fingerprint based on whether the profile includes the legitimate characteristics specified by the fingerprint.

If the security module 108 determines that the profile conforms to the legitimate fingerprint, the security module identifies the profile as being legitimate. On the other hand, if it is determined that the profile does not conform to the legitimate fingerprint, the security module 108 identifies the profile as being suspicious.

If the profile is identified as being suspicious, the security module 108 analyzes 406 the profile and determines whether it conforms to a malicious profile. In one embodiment, the security module 108 analyzes the profile to determine whether it conforms to the malicious profile, even if it was not identified as being suspicious. The malicious fingerprint describes characteristics of malicious profiles. The security module 108 determines whether the profile conforms to the malicious fingerprint based on whether the profile includes the malicious characteristics specified by the fingerprint.

If the profile does not conform to the malicious profile, the security module 108 identifies the profile as being legitimate. If the profile conforms to the malicious fingerprint, the profile is identified as being a malicious profile. If the profile is malicious, the security module 108 reports 408 that the profile is malicious.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The invention claimed is:

1. A computer-implemented method for detecting a malicious social networking profile, the method comprising:

detecting, by a computer system, access of a social networking profile on a social networking website;

selecting, by the computer system, based on a type of the social networking profile, at least one fingerprint from a plurality of fingerprints, each of the plurality of fingerprints specifying characteristics for evaluating one or more types of social networking profiles, the selected fingerprint comprising a legitimate fingerprint that specifies characteristics of legitimate social networking profiles of the type;

evaluating, by the computer system, whether the social networking profile includes characteristics specified by the selected fingerprint;

determining, by the computer system, whether the social networking profile is suspicious based on the evaluation;

responsive to a determination that the social networking profile is suspicious, identifying, by the computer system, a malicious fingerprint, the malicious fingerprint specifying characteristics of malicious social networking profiles;

evaluating, by the computer system, whether the social networking profile includes the characteristics specified by the malicious fingerprint;

determining, by the computer system, whether the social networking profile is malicious based on the evaluation of whether the social networking profile includes the characteristics specified by the malicious fingerprint; and responsive to determining that the social networking profile is malicious, reporting, by the computer system, the social networking profile as being malicious.

2. The method of claim 1, wherein determining whether the social networking profile is suspicious further comprises:

calculating a suspiciousness score, each of the characteristics specified by the legitimate fingerprint contributing points to the suspiciousness score based on whether the characteristic is included in the social networking profile; and determining whether the social networking profile is suspicious responsive to the suspiciousness score.

3. The method of claim 1, wherein the identified malicious fingerprint specifies characteristics of malicious social networking profiles of the type.

4. The method of claim 1, wherein determining whether the social networking profile is malicious further comprises:

calculating a validation score, each of the characteristics specified by the malicious fingerprint contributing points to the validation score based on whether the characteristic is included in the social networking profile; and determining whether the social networking profile is malicious responsive to the validation score.

5. The method of claim 1, further comprising:

responsive to a determination that the social networking profile is malicious, preventing a browser from being redirected to a domain different than the domain of the social networking website.

6. A computer program product having a non-transitory computer-readable storage medium having computer-executable code for detecting a malicious social networking profile, the computer-executable code comprising:

a monitoring module configured to detect access of a social networking profile on a social networking website;

a suspicion module configured to:

select, based on a type of the social networking profile, at least one fingerprint from a plurality of fingerprints, each of the plurality of fingerprints specifying characteristics for evaluating one or more types of social networking profiles, the selected fingerprint comprising a legitimate fingerprint that specifies characteristics of legitimate social networking profiles of the type;

evaluate whether the social networking profile includes characteristics specified by the selected fingerprint; and determine whether the social networking profile is suspicious based on the evaluation;

a validation module configured to:

responsive to a determination that the social networking profile is suspicious, identify a malicious fingerprint, the malicious fingerprint specifying characteristics of malicious social networking profiles;

evaluate whether the social networking profile includes the characteristics specified by the malicious fingerprint; and determine whether the social networking profile is malicious based on the evaluation of whether the social networking profile includes the characteristics specified by the malicious fingerprint; and a reporting module configured to report the social networking profile as being malicious, responsive to determining that the social networking profile is malicious.

7. The computer program product of claim 6, wherein the suspicion module is further configured to:

calculate a suspiciousness score, each of the characteristics specified by the legitimate fingerprint contributing points to the suspiciousness score based on whether the characteristic is included in the social networking profile; and determine whether the social networking profile is suspicious responsive to the suspiciousness score.

8. The computer program product of claim 6, wherein the identified malicious fingerprint specifies characteristics of malicious social networking profiles of the type.

9. The computer program product of claim 6, wherein the validation module is further configured to:

calculate a validation score, each of the characteristics specified by the malicious fingerprint contributing points to the validation score based on whether the characteristic is included in the social networking profile; and determine whether the social networking profile is malicious responsive to the validation score.

10. The computer program product of claim 6, wherein the reporting module is further configured to:

prevent a browser from being redirected to a domain different than the domain of the social networking website, responsive to a determination that the social networking profile is malicious.

11. A computer system for detecting a malicious social networking profile, the system comprising:

a computer processor; and a non-transitory computer-readable storage medium storing computer program modules configured to execute on the computer processor, the computer program modules comprising:

a monitoring module configured to detect access of a social networking profile on a social networking website;

a suspicion module configured to:

select, based on a type of the social networking profile, at least one fingerprint from a plurality of fingerprints, each of the plurality of fingerprints specifying characteristics for evaluating one or more types of social networking profiles, the selected fingerprint comprising a legitimate fingerprint that specifies characteristics of legitimate social networking profiles of the type;

evaluate whether the social networking profile includes characteristics specified by the selected fingerprint; and determine whether the social networking profile is suspicious based on the evaluation;

a validation module configured to:

responsive to a determination that the social networking profile is suspicious, identify a malicious fingerprint, the malicious fingerprint specifying characteristics of malicious social networking profiles;

evaluate whether the social networking profile includes the characteristics specified by the malicious fingerprint;

determine whether the social networking profile is malicious based on the evaluation of whether the social networking profile includes the characteristics specified by the malicious fingerprint; and a reporting module configured to report the social networking profile as being malicious, responsive to determining that the social networking profile is malicious.

12. The computer system of claim 11, wherein the suspicion module is further configured to:

calculate a suspiciousness score, each of the characteristics specified by the legitimate fingerprint contributing points to the suspiciousness score based on whether the characteristic is included in the social networking profile; and determine whether the social networking profile is suspicious responsive to the suspiciousness score.

13. The computer system of claim 11, wherein the identified malicious fingerprint specifies characteristics of malicious social networking profiles of the type.

14. The method of claim 1, wherein the type is that the social networking profile is part of the social networking website, the selected fingerprint specifying characteristics of social networking profiles that are part of the social networking website.

15. The method of claim 1, wherein the characteristics of legitimate social networking profiles of the type include at one of following characteristics:

general information about an entity associated with the profile;

activity of the entity;

state of the entity;

attributes of the entity;

presence of a friends list;

presence of a comments list;

presence of a specific format of the profile;

tags required by social networking service in the profile; and fields required by the social networking profile.

16. The method of claim 1, wherein determining whether the social networking profile is suspicious further comprises:

determining whether the social networking profile has at least a specified number of legitimate characteristics specified by the legitimate fingerprint; and responsive to the social networking profile not having the specified number of legitimate characteristics, determining that the social networking profile is suspicious.

17. The method of claim 2, wherein calculate a suspiciousness score comprises:

adding the points contributed by each legitimate characteristic to the suspiciousness score, wherein different characteristics specified by the legitimate fingerprint contribute different amount of points to the suspiciousness score; and determining that the social networking profile is suspicious responsive to a comparison of the suspiciousness score with a threshold.

* * * * *